United States Patent
Duluk, Jr. et al.

(10) Patent No.: US 9,418,616 B2
(45) Date of Patent: *Aug. 16, 2016

(54) TECHNIQUE FOR STORING SHARED VERTICES

(71) Applicant: NVIDIA CORPORATION, Santa Clara, CA (US)

(72) Inventors: Jerome F. Duluk, Jr., Palo Alto, CA (US); Ziyad S. Hakura, Gilroy, CA (US); Henry Packard Moreton, Woodside, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 13/723,078

(22) Filed: Dec. 20, 2012

(65) Prior Publication Data

US 2014/0176589 A1 Jun. 26, 2014

(51) Int. Cl.
*G06T 15/00* (2011.01)
*G06T 1/60* (2006.01)
*G09G 5/00* (2006.01)

(52) U.S. Cl.
CPC .......... *G09G 5/001* (2013.01); *G06T 1/60* (2013.01); *G06T 15/005* (2013.01)

(58) Field of Classification Search
CPC ............................. G06T 15/005; G06T 1/60
USPC ........................... 345/501, 530, 565
See application file for complete search history.

(56) References Cited

U.S. PATENT DOCUMENTS

| | | | | |
|---|---|---|---|---|
| 7,209,139 B1 * | 4/2007 | Keet et al. | ...................... | 345/427 |
| 7,324,115 B2 * | 1/2008 | Fraser | ........................... | 345/553 |
| 8,675,000 B2 * | 3/2014 | Labour | .......................... | 345/522 |
| 8,760,457 B2 * | 6/2014 | Bourd et al. | .................. | 345/531 |
| 9,064,334 B2 * | 6/2015 | Patel | ........................ | G06T 15/50 |
| 2004/0233207 A1 | 11/2004 | Morphet | | |
| 2007/0030279 A1 | 2/2007 | Paltashev et al. | | |
| 2011/0055511 A1 | 3/2011 | Mantor et al. | | |
| 2014/0022264 A1 * | 1/2014 | Shreiner | .................. | G06T 17/20 345/520 |

FOREIGN PATENT DOCUMENTS

| | | |
|---|---|---|
| TW | I323432 B | 4/2010 |
| WO | 2004046881 A2 | 6/2004 |

* cited by examiner

*Primary Examiner* — Joni Richer
(74) *Attorney, Agent, or Firm* — Artegis Law Group, LLP

(57) ABSTRACT

A graphics processing unit includes a set of geometry processing units each configured to process graphics primitives in parallel with one another. A given geometry processing unit generates one or more graphics primitives or geometry objects and buffers the associated vertex data locally. The geometry processing unit also buffers different sets of indices to those vertices, where each such set represents a different graphics primitive or geometry object. The geometry processing units may then stream the buffered vertices and indices to global buffers in parallel with one another. A stream output synchronization unit coordinates the parallel streaming of vertices and indices by providing each geometry processing unit with a different base address within a global vertex buffer where vertices may be written. The stream output synchronization unit also provides each geometry processing unit with a different base address within a global index buffer where indices may be written.

20 Claims, 10 Drawing Sheets

TECHNIQUE FOR STORING SHARED VERTICES

BACKGROUND OF THE INVENTION

1. Field of the Invention

The present invention generally relates to processing graphics data and, more specifically, to a technique for storing shared vertices.

2. Description of the Related Art

A conventional graphics processing unit (GPU) typically implements a graphics processing pipeline that includes a sequence of graphics processing stages. At each stage in the graphics processing pipeline, the GPU may perform one or more different graphics-oriented processing operations. For example, at one stage, the GPU could assemble a set of primitives that represent a graphics scene, and at a subsequent stage the GPU could perform shading operations with vertices associated with that set of primitives. Finally, the GPU could rasterize those vertices into pixels that represent the graphics scene.

A GPU that implements a conventional graphics processing pipeline, such as that described in the above example, typically includes a geometry shading unit configured to perform shading operations with vertices and geometry-based information and to then output one or more graphics primitives or one or more geometry objects of relatively greater complexity to a subsequent unit for rasterization. For each generated graphics primitive or geometry object, the geometry shading unit outputs vertex data corresponding to each vertex associated with that graphics primitive or geometry object. For example, when processing a triangle, the geometry shading unit would output vertex data for each of the three vertices of that triangle. Vertex data for a given vertex could describe the position of the vertex within the scene, coverage data associated with the vertex, or a set of attributes associated with the vertex, among other things. When generating graphics primitives or geometry objects, the geometry shading unit typically stores each generated graphics primitive or each graphics primitive making up all or a portion of a generated geometry object as the set of vertices associated with that primitive and the vertex data corresponding to each vertex in that set.

Again, in some situations, the geometry shading unit may generate a geometry object that includes a collection of interconnected graphics primitives that share vertices. The geometry object could be, e.g., a fan, a strip or a mesh type of geometry object. For example, a given graphics scene could include numerous individual graphics primitives interconnected in a fan, a strip or a mesh to create the appearance of a surface having an arbitrary shape. Each graphics primitive within the surface could be connected to a neighboring graphics primitive by one or more vertices shared between the two graphics primitives. In other situations, multiple geometry objects, such as triangles or strips, that share one or more common vertices may be generated by the geometry shading unit.

In these different situations, the geometry shading unit typically stores redundant copies of the vertex data associated with each vertex shared between graphics primitives or geometry objects. However, this approach is problematic because a typical graphics scene may include millions of shared vertices. Consequently, a conventional geometry shading unit may store millions of copies of redundant data. Processing this redundant data consumes GPU resources inefficiently and may reduce the speed with which a graphics scene may be rendered.

Accordingly, what is needed in the art is an improved technique for processing vertices shared between graphics primitives or geometry objects within a graphics scene.

SUMMARY OF THE INVENTION

One embodiment of the present invention sets forth a computer-implemented method for buffering data associated with geometry objects. The method includes receiving a first geometry object, generating a first set of vertices associated with the first geometry object, and storing a first set of indices within a first entry in a local index buffer, where each index in the first set of indices references a different vertex in the first set of vertices, and where the first entry corresponds to a graphics primitive or a geometry object associated with the first set of vertices.

One advantage of the disclosed approach is that redundant copies of vertex data are not stored in either the vertex buffers local to the different geometry shading units or the global vertex buffer since the vertex data is indexed, thereby conserving processing unit resources and increasing overall processing efficiency.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
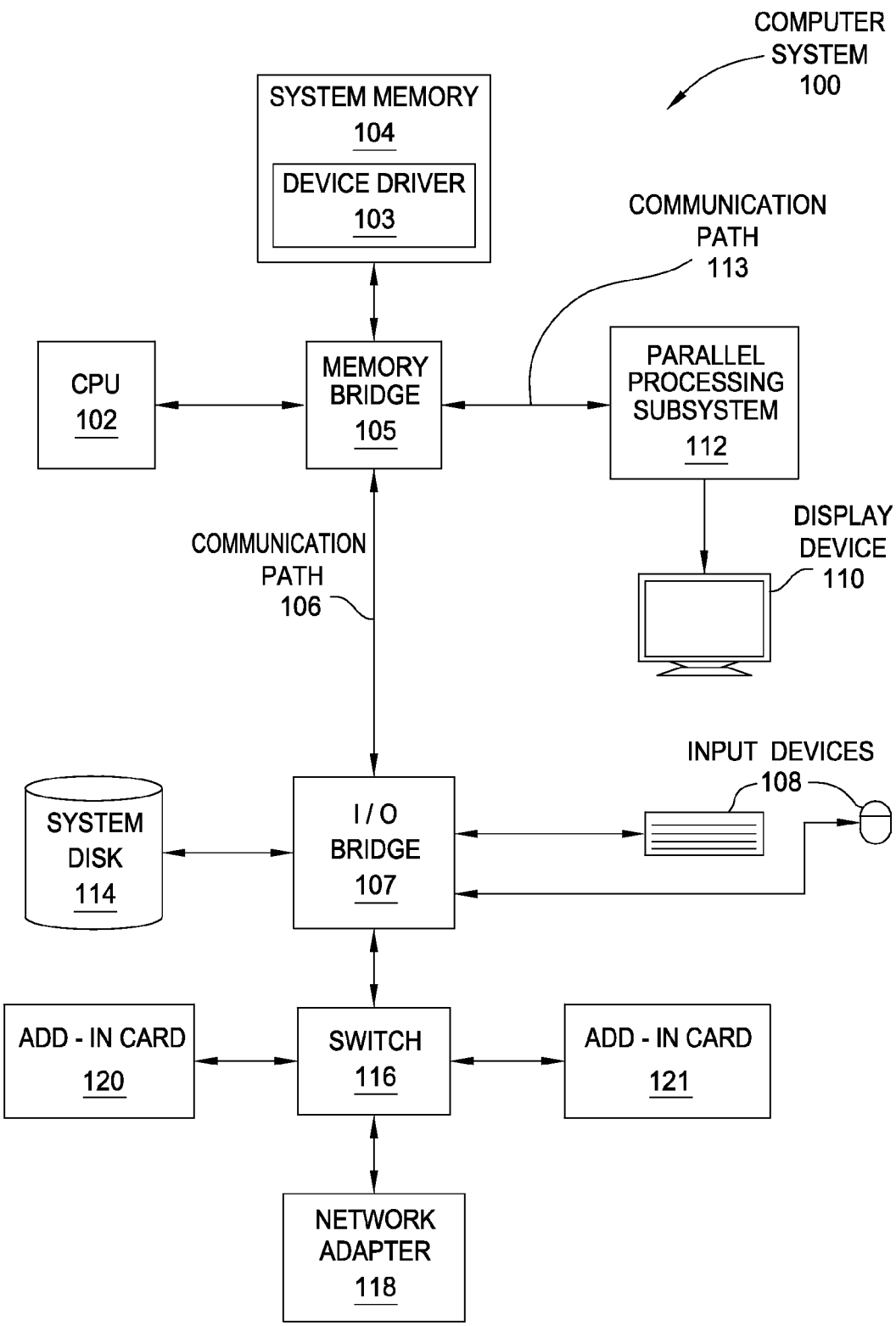
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
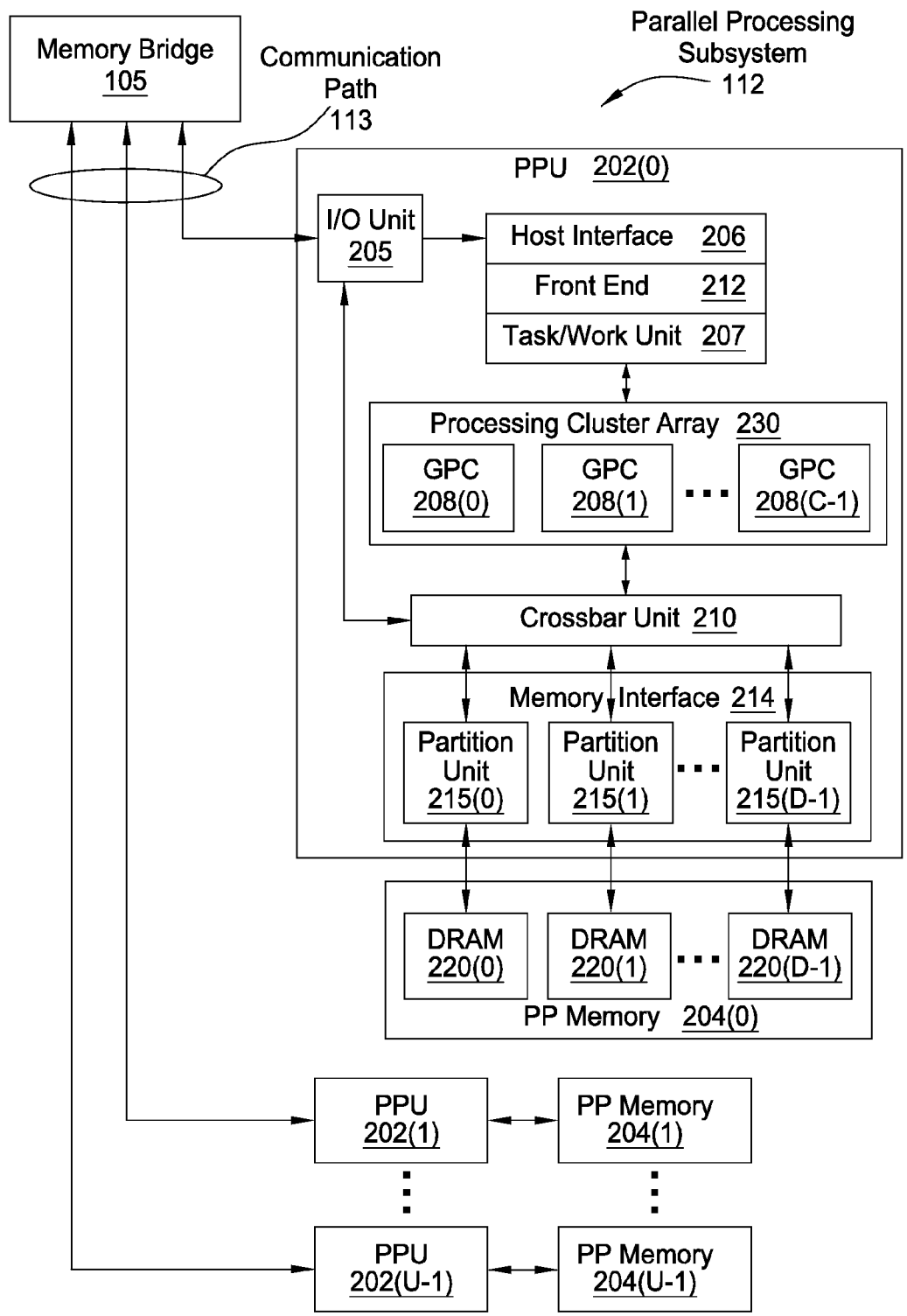
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3:
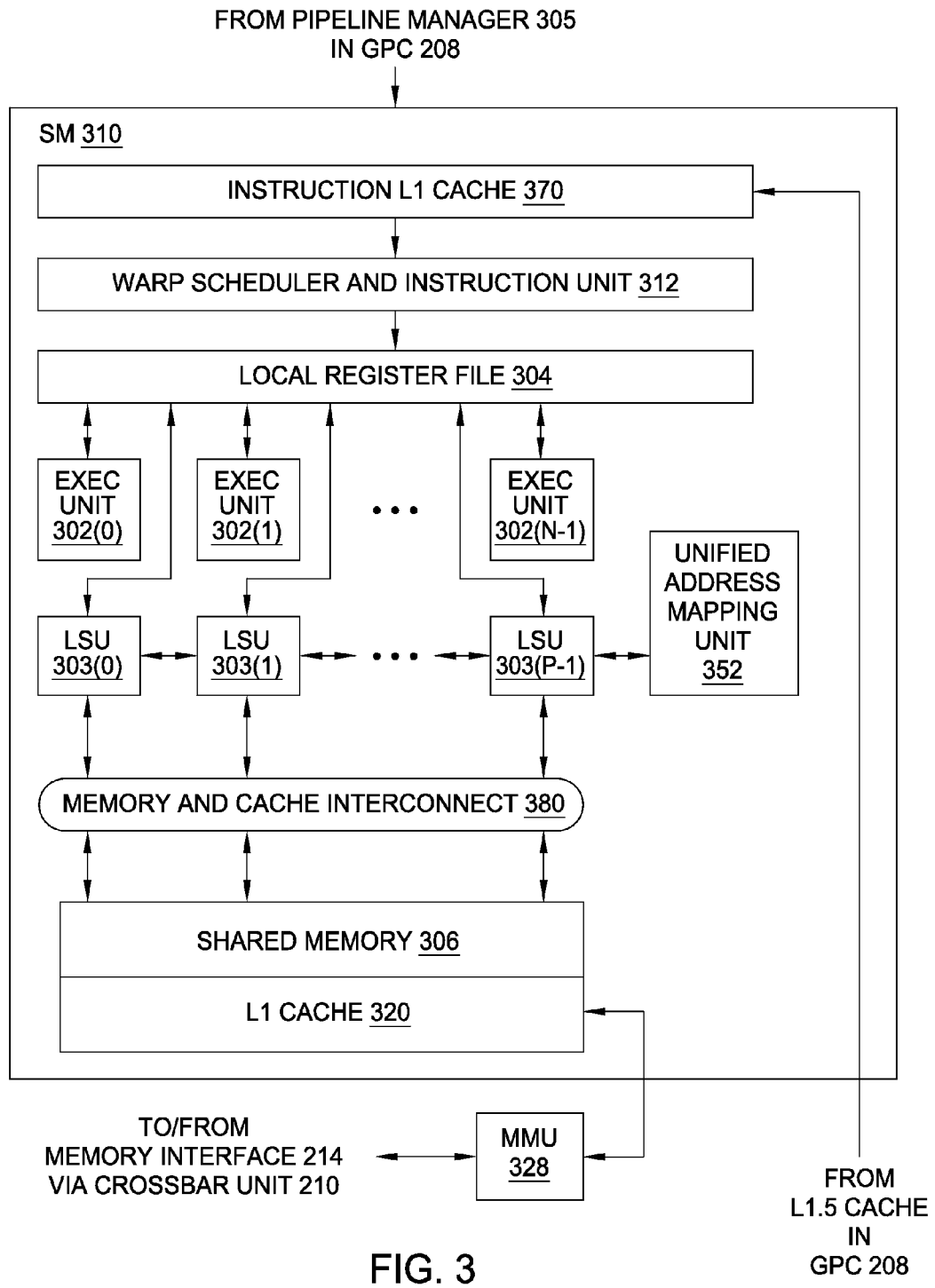
FIG. 3 is a block diagram of a portion of a streaming multiprocessor within the general processing cluster of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAS, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAS to be launched and executed to process the fixed amount of data stored in the queue 525. The number of CTAS is specified as the product of the grid width, height, and depth. The fixed amount of data may be stored in the TMD 322 or the TMD 322 may store a pointer to the data that will be processed by the CTAS. The TMD 322 also stores a starting address of the program that is executed by the CTAS.

If the TMD 322 is a queue TMD, then a queue feature of the TMD 322 is used, meaning that the amount of data to be processed is not necessarily fixed. Queue entries store data for processing by the CTAS assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAS that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
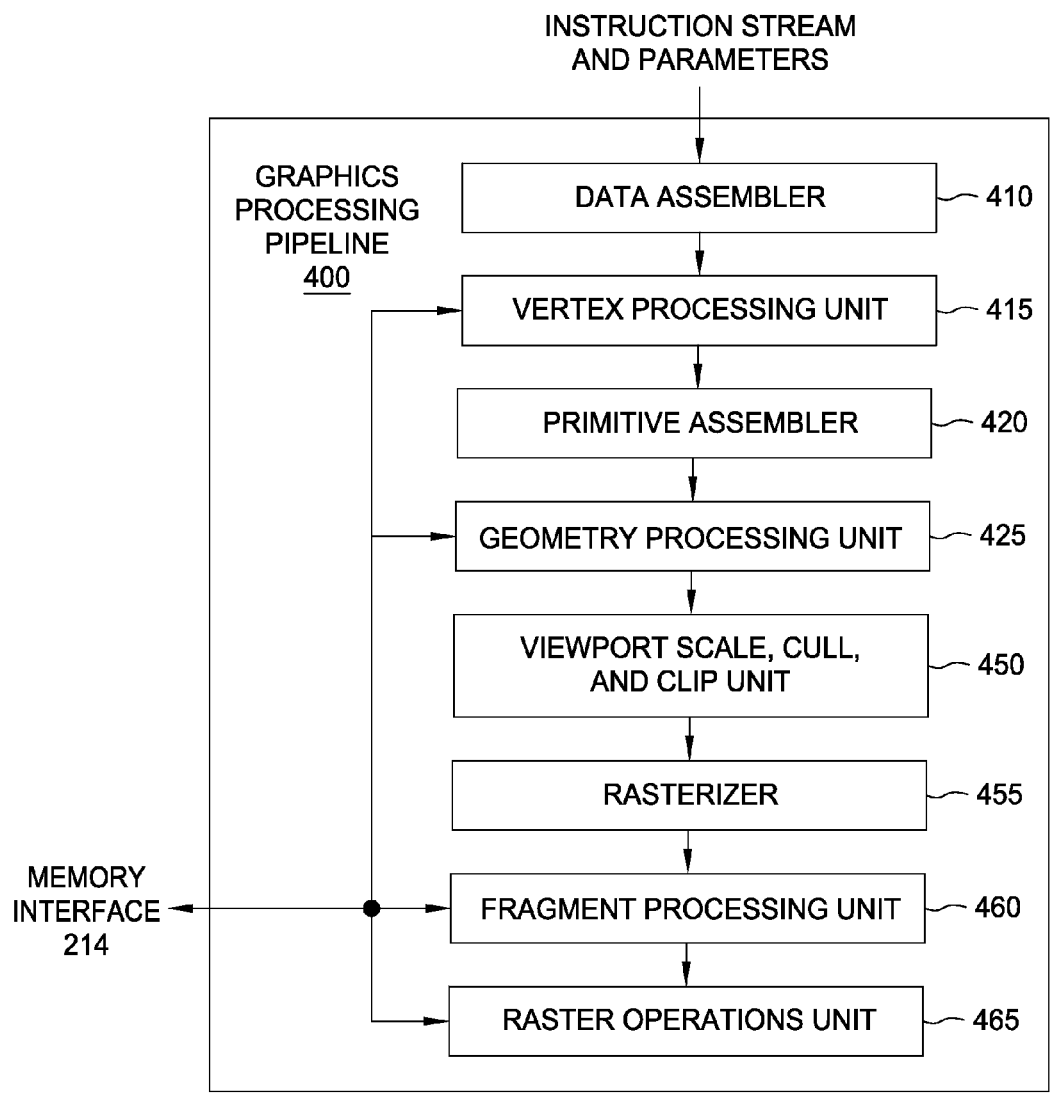
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives. Geometry processing unit 425 also may be programmed to generate additional graphics primitives or one or more geometry objects made up of one or more graphics primitives based on the graphics primitives received from primitive assembler 420.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Processing Vertices Shared Between Graphics Primitives

Figure 5:
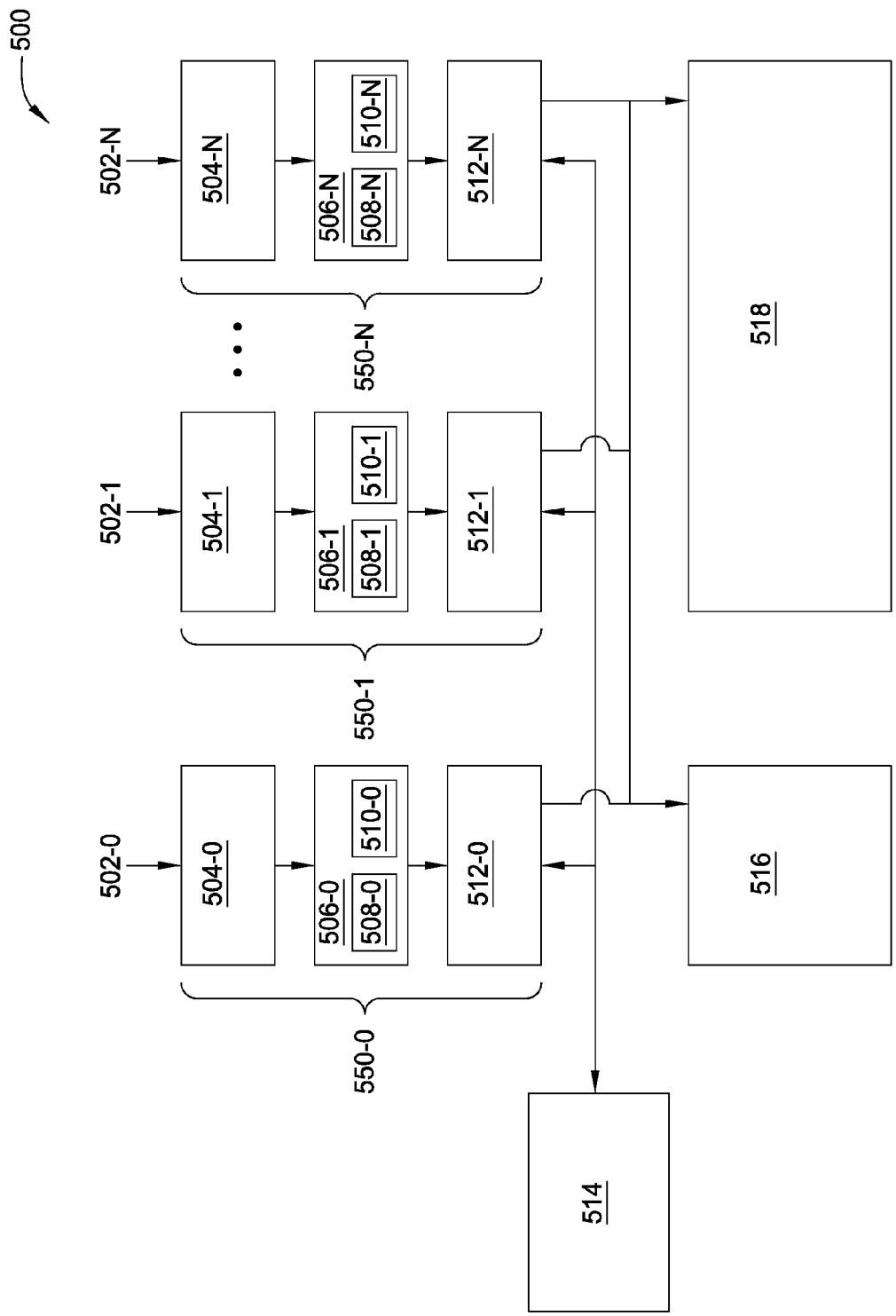
FIG. 5 is a conceptual diagram of a collection of geometry processing units, according to one embodiment of the present invention.

FIG. 5 is a conceptual diagram that illustrates a subsystem 500 that includes geometry processing units 550-0 to 550-N, according to one embodiment of the present invention. As shown, each of geometry processing units 550-0 to 550-N is coupled to a stream output synchronization (SSYNC) unit 514, a global index buffer 516, and a global vertex buffer 518. Each geometry processing unit 550 includes a geometry shading unit 504, a buffer 506 that includes a local index buffer 508 and a local vertex buffer 510, and a stream output unit 512.

As is shown, geometry shading unit 504-0 includes geometry shading unit 504-0, buffer 506-0 that includes local index buffer 508-0 and local vertex buffer 510-0, and stream output unit 512-0. Likewise, geometry shading unit 504-1 includes geometry shading unit 504-1, buffer 506-1 that includes local index buffer 508-1 and local vertex buffer 510-1, and stream output unit 512-1, and geometry shading unit 504-N includes geometry shading unit 504-N, buffer 506-N that includes local index buffer 508-N and local vertex buffer 510-0, and stream output unit 512-N. In the following description, multiple instances of like objects are denoted with reference numbers identifying the object and hyphenated reference numbers identifying the instance where needed.

Geometry processing unit 550 is configured to process graphics primitives or geometry objects 502 and to generate one or more graphics primitives or one or more graphic objects made up of one or more graphics primitives. Graphics processing unit 550 is further configured to then stream vertex data and index information associated with the generated graphics primitives or geometry objects to global vertex buffer 518 and global index buffer 516, respectively. SSYNC unit 514 is configured to coordinate the streaming of this data across the different geometry processing units 550.

Geometry processing unit 550 may be implemented by SM 310 shown in FIG. 3 and may represent a processing stage within graphics processing pipeline 400 shown in FIG. 4. In one embodiment, geometry processing unit 550 is similar to geometry processing unit 425 shown in FIG. 4. Geometry shading unit 504 within geometry processing unit 550 is configured to receive graphics primitives or geometry objects 502 from an upstream processing unit, such as, e.g., primitive assembler 420 shown in FIG. 4. Graphics primitives may represent, e.g., triangles, rectangles, line segments, points, or other types of graphics primitives. Geometry objects may represent higher-level graphics constructs that can be comprised of a single graphics primitive or can be broken down into a collection of graphics primitives, where that collection could represent a strip, fan, or mesh-type geometry object. In various embodiments, graphics primitives or geometry objects 502 may represent a portion of a graphics scene or may correspond to a particular region of a display screen associated with geometry processing unit 550.

When geometry processing unit 550 receives a graphics primitive or geometry object 502, geometry shading unit 504 is configured to perform one or more geometry shading operations on vertices and other information associated with that graphics primitive or geometry object 502. The vertices and other information associated with a given graphics primitive or geometry object 502 could represent, e.g., the corners of a triangle or other polygon. Those vertices and other information may also include vertex attributes associated with the graphics primitive or geometry object 502 as well as other types of vertex data. Geometry shading unit 504 is configured to store the vertex data associated with the one or more graphics primitives or one or more geometry objects generated by geometry shading unit 504 within local vertex buffer 510.

In situations where geometry shading unit 504 generates different graphics primitives or geometry objects that share a given vertex, such as when subdividing a geometry object 502 into smaller graphics primitives, geometry shading unit 504 is configured to buffer the shared vertex and associated vertex data just once within local vertex buffer 510. With this approach, geometry shading unit 504 advantageously avoids buffering redundant copies of vertices and the associated vertex data. For example, geometry shading unit 504 could, receive a single graphics primitive 502 and then generate a collection of graphics primitives based on the graphics primitive 502 that share vertices with one another. The collection of graphics primitives generated could be a "strip," "fan," or "mesh" construct. In this situation, geometry shading unit 504 stores each unique vertex just one time within local vertex buffer 510.

Geometry shading unit 504 is also configured to maintain connectivity information for a graphics primitive 502 by generating a set of indices into the local vertex buffer 510 that references the vertices associated with the graphics primitives or graphics objects generated by geometry shading unit 504. In one embodiment, geometry shading unit 504 may determine that a given vertex already resides within local vertex buffer 510, and may then generate the set of indices to include an index that references the given vertex, i.e. without re-storing that vertex within local vertex buffer 510. Geometry shading unit 504 is configured to store the set of indices for each generated graphics primitive or geometry object within an entry in local index buffer 508. In general, each index within an entry in local index buffer 508 may correspond to a different vertex stored in local vertex buffer 510, and a set of indices stored within an entry in local index buffer 508 may correspond to a particular graphics primitive, a particular geometry object, or any collection of vertices that represent an object within the graphics scene. For example, geometry shading unit 504 may also store sets of indices that represent higher-level geometry objects, such as "large" polygons that can be broken down into multiple interconnected graphics primitives, including strip, fan, and mesh type objects.

A set of indices within local index buffer 508 may reference different vertices within local vertex buffer 510 directly, i.e. by specifying various addresses within local vertex buffer 510. Alternatively, the set of indices may also reference the different vertices by specifying a local offset within local vertex buffer 510 or a local index within local vertex buffer 510.

At various times, stream output unit 512 that is coupled to buffer 506 may stream the vertices stored within local vertex buffer 510 and the indices stored within local index buffer 508 to global vertex buffer 518 and to global index buffer 516, respectively. Before doing so, however, stream output unit 512 is configured to first determine the number of vertices stored in local vertex buffer 510 as well as the number of indices stored in local index buffer 508. Stream output unit 512 then communicates these numbers to SSYNC unit 514.

SSYNC unit 514 responds to stream output unit 512 with a base address within global vertex buffer 518 and a base address within global index buffer 516. The base address within global vertex buffer 518 represents a position within that buffer where stream output unit 512 may safely write the number of vertices communicated to SSYNC unit 514 by stream output unit 512. Likewise, the base address within global index buffer 516 represents a position within that buffer where stream output unit 512 may safely write the number of indices communicated to SSYNC unit 514 by stream output unit 512.

SSYNC unit 514 is configured to generate these base addresses using a technique described in greater detail below. Upon receiving the base address within global vertex buffer, stream output unit 512 may then copy the vertices within local vertex buffer 510 to global vertex buffer 518 starting at that base address. Further, upon receiving the base address within global index buffer, stream output unit 512 may then copy the indices within local index buffer 508 to global index buffer 516 starting at that base address.

When copying indices from local index buffer 508 to global index buffer 516, stream output unit 512 is configured to update those indices to reflect the new positions of the referenced vertices within global vertex buffer 518. In one embodiment, stream output unit 512 increments each index by a value equal to the base address within global vertex buffer 518.

With the above approach, each of geometry processing units 550-0 to 550-N is configured to process graphics primitives or geometry objects in parallel with one another and to then buffer the results of that processing as well as the associated indices within local buffers. The locally buffered vertices and indices data may then be streamed to global buffers.

As mentioned above, SSYNC unit 514 is configured to coordinate the streaming of vertices and indices to global vertex buffer 518 and global index buffer 516, respectively, between different geometry processing units 550. In practice, SSYNC unit 514 is configured to service each of stream output units 512-0 to 512-N according to a sequence. In doing so, SSYNC unit 514 communicates a base address within global vertex buffer 518 and a base address within global index buffer 516 to each stream output unit 512-0 to 512-N according to that sequence. In one embodiment, the sequence is an application programming interface (API) order. In a further embodiment, the sequence is defined by a software application executing on geometry processing unit 550, and a programmer of that software application determines the sequence.

SSYNC unit 514 is configured to provide a different base address within global index buffer 516 and a different base address within local index buffer 518 to each stream output unit 512 when sequentially servicing those stream output units 512. Accordingly, each different stream output unit 512 is capable of writing vertices and indices to a different portion of global vertex buffer 518 and global index buffer 516, respectively. In one embodiment, each stream output unit 512 is capable of writing vertices and indices to global vertex buffer 518 and global index buffer 516, respectively, in parallel with other stream output units 512 writing vertices and indices to those buffers.

SSYNC unit 514 determines a base address within global vertex buffer 518 for a given stream output unit 512 in the sequence based on the number of vertices written to global vertex buffer 518 by a previous stream output unit 512 in the sequence. More specifically, SSYNC unit 514 maintains a "current" base address within global vertex buffer 518 that indicates a location within global vertex buffer 518 where vertices may be safely written. Upon receiving data indicating the number of vertices to be written by a particular stream output unit 512 to global vertex buffer 518, SSYNC unit 514 transmits the "current" base address within global vertex buffer 518 to that stream output unit 512 for use when writing vertices. SSYNC unit 514 then updates the "current" base address within global vertex buffer 518 based on that number of vertices and based on the size of those vertices. Subsequently, the updated base address within global vertex buffer 518 represents a position within that buffer where a subsequent stream output unit 512 in the sequence of stream output units 512 may safely write vertex data.

SSYNC unit 514 also determines a base address within global index buffer 516 for a given stream output unit 512 in the sequence based on the number of indices written to global index buffer 516 by a previous stream output unit 512 in the sequence. More specifically, SSYNC unit 514 maintains a "current" base address within global index buffer 516 that indicates a location within global index buffer 516 where indices may be safely written. Upon receiving data indicating the number of indices to be written by a particular stream output unit 512 to global index buffer 516, SSYNC unit 514 transmits the "current" base address within global index buffer 516 to that stream output unit 512 for use when writing indices. SSYNC unit 514 then updates the "current" base address within global index buffer 516 based on that number of indices and based on the size of those indices. Subsequently, the updated base address within global index buffer 516 represents a position within that buffer where a subsequent stream output unit 512 in the sequence of stream output units 512 may safely write index data.

By implementing the approach described above, SSYNC unit 514 is configured to maintain a "current" base address within global vertex buffer 518 and a "current" base address within global index buffer 516 that can be provided to a given stream output unit 512. SSYNC unit 514 is also configured to then update those "current" base addresses in order to accommodate a subsequent stream output unit 512 attempting to stream vertices and indices to global vertex buffer 518 and global index buffer 516.

Various approaches for implementing the functionality described herein are described in greater detail below in conjunction with FIGS. 6-8 with reference to different flow diagrams. The functionality described herein is also illustrated below, by way of example, in conjunction with FIGS. 9-10.

Figure 6:
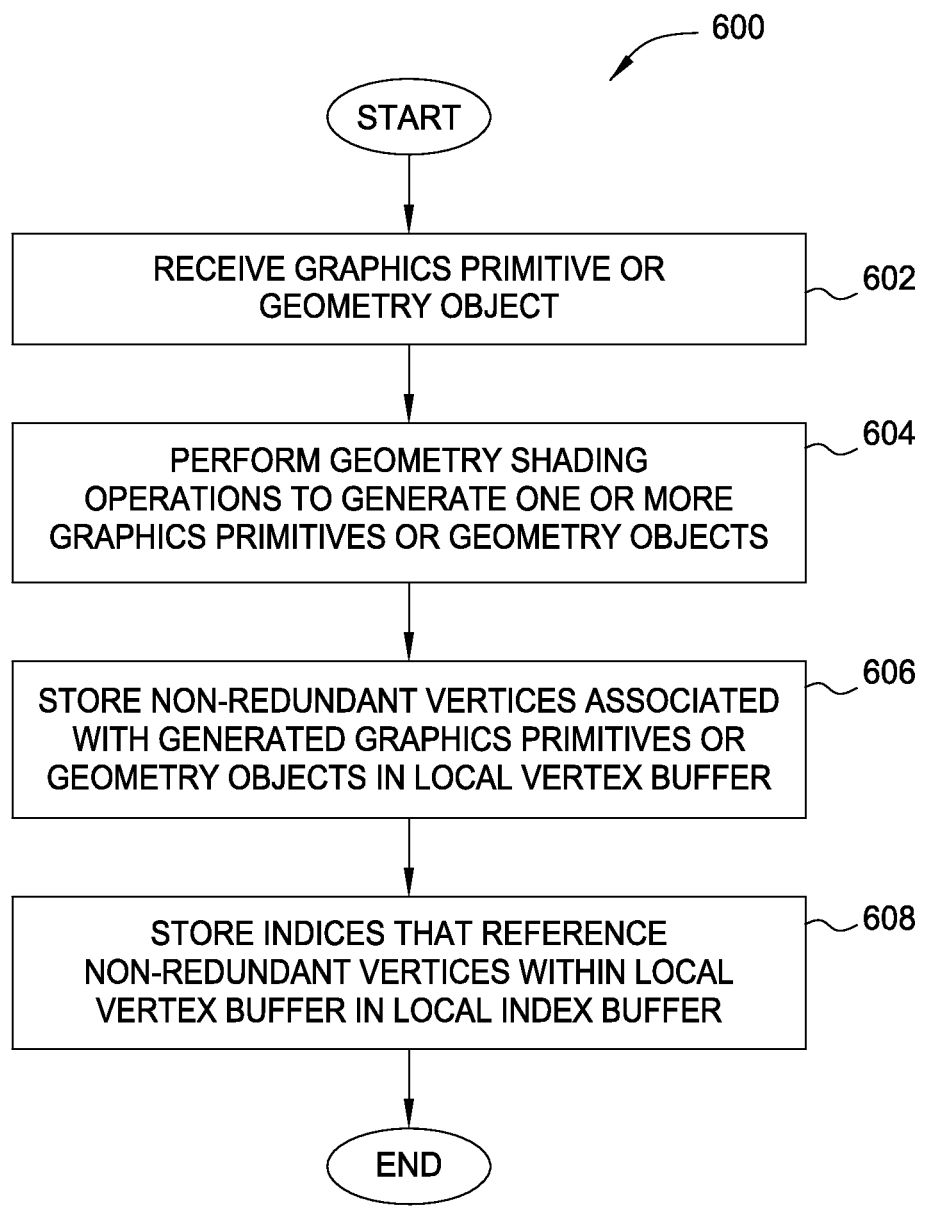
FIG. 6 is a flow diagram of method steps for storing vertex data and index data within a plurality of local buffers, according to one embodiment of the present invention.

FIG. 6 is a flow diagram of method steps for storing vertex data and index data within local vertex buffer 510 and local index buffer 508, respectively, according to one embodiment of the present invention. Although the method steps are described in conjunction with the systems of FIGS. 1-3, persons of ordinary skill in the art will understand that any system configured to perform the method steps, in any order, is within the scope of the invention.

As shown, a method 600 begins at step 602, where geometry processing unit 550 receives a graphics primitive or geometry object 502. At step 604, geometry shading unit 504 within geometry processing unit 550 performs one or more geometry shading operations on the graphics primitive or geometry object 502. In so doing, geometry shading unit 504 may be programmed to generate additional graphics primitives or one or more geometry objects made up of one or more graphics primitives based on the received graphics primitive or geometry object 502. In one embodiment, for example, geometry processing unit 550 may receive a geometry object and then generate multiple graphics primitives by subdividing the geometry object into a collection of interconnected graphics primitives that share one or more vertices with one another.

At step 606, geometry shading unit 504 stores the vertices associated with graphics primitives or geometry objects generated by geometry shading unit 504 within local vertex buffer 510. In situations where a particular generated graphics primitive or geometry object is associated with a vertex already stored within local vertex buffer 510 (e.g. that vertex is shared with another generated graphics primitive or geometry object), geometry shading unit 504 may skip step 606 with respect to that vertex. With this approach, geometry shading unit 504 advantageously avoids buffering redundant copies of the generated vertices and their associated vertex data.

At step 608, geometry shading unit 504 stores indices within local index buffer 508 that reference vertices within local vertex buffer 510. The indices within local index buffer 508 may reference different vertices within local vertex buffer 510 directly, i.e. by specifying various addresses within local vertex buffer 510. Alternatively, the indices may also reference the different vertices by specifying a local offset within local vertex buffer 510 or a local index within local vertex buffer 510. In general, the indices stored within local index buffer 508 at step 608 represent the vertices corresponding to the graphics primitives or geometry objects generated at step 604. The method 600 then ends.

By implementing the approach described above, vertices generated by a geometry processing unit 550 that are associated with generated primitives or geometry objects can be buffered locally and indexed locally, thereby preventing a situation where multiple copies of vertices and associated vertex data are stored redundantly. In addition, when a system includes multiple geometry processing unit 550, each of those geometry processing units 550 can generate graphics primitives or geometry objects and then buffer the vertices and indices associated with those graphics primitives or geometry objects locally, in parallel with other geometry processing units 550. Persons skilled in the art will recognize that the method 600 could also be applied to processing a geometry object or any other higher-level graphics construct that includes a collection of vertices. For example, the method 600 could be applied to store vertices and associated indices for a polygon, where that polygon could be broken down into a collection of interconnected graphics primitives that share one or more vertices.

Each of geometry processing units 550 is also configured to communicate with SSYNC unit 514 in order to coordinate the streaming of vertices and indices to global vertex buffer 518 and global index buffer 516, respectively, as discussed in greater detail below in conjunction with FIG. 7.

Figure 7:
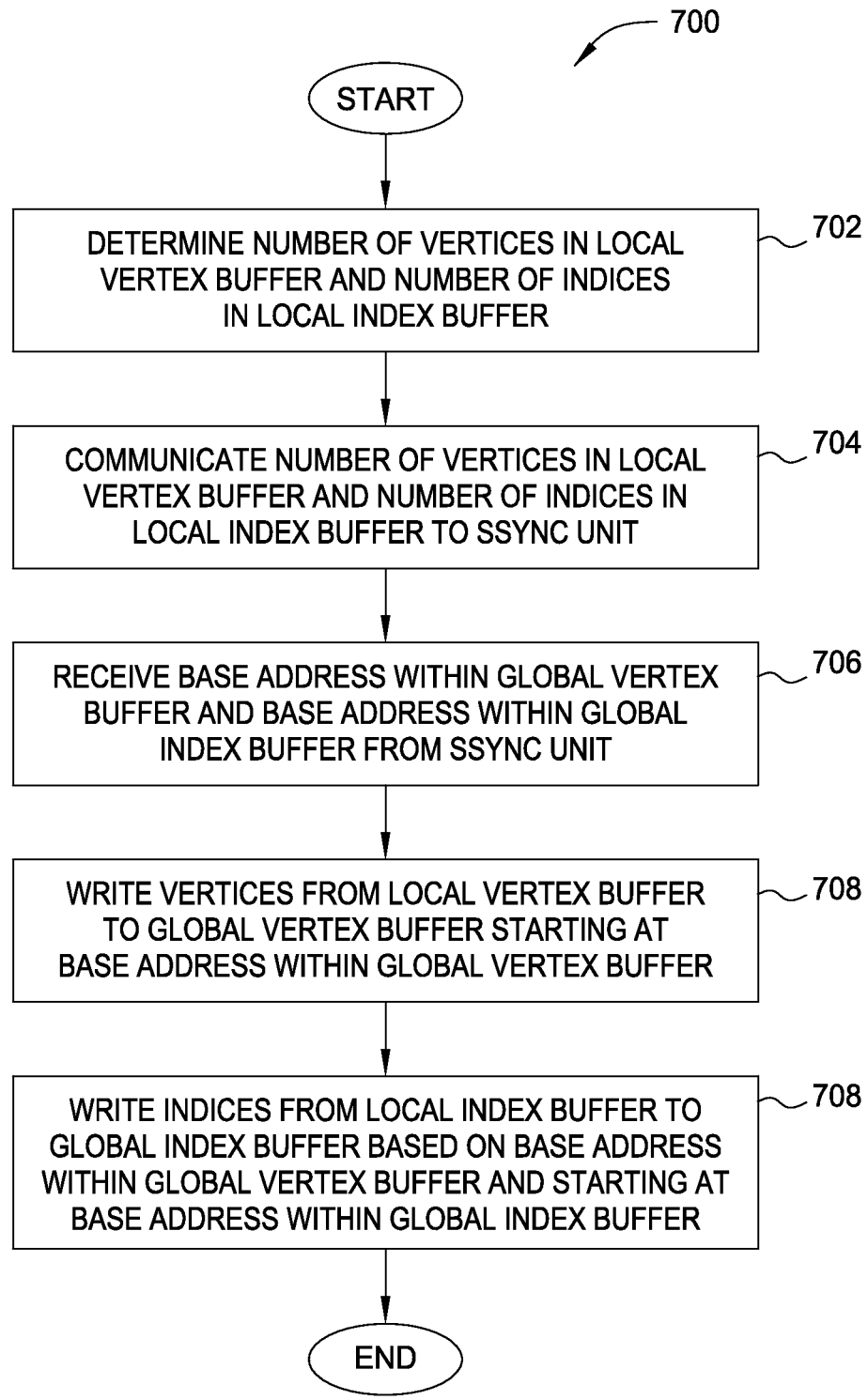
FIG. 7 is a flow diagram of method steps for streaming vertices and indices to a plurality of global buffers, according to one embodiment of the present invention.

FIG. 7 is a flow diagram of method steps for streaming vertices and indices to a plurality of global buffers, according to one embodiment of the present invention. Although the method steps are described in conjunction with the systems of FIGS. 1-3, persons of ordinary skill in the art will understand that any system configured to perform the method steps, in any order, is within the scope of the invention.

As shown, a method 700 begins at step 700, where stream output unit 512 within geometry processing unit 550 determines the number of vertices within local vertex buffer 510 and the number of indices within local index buffer 508. The vertices and indices within local vertex buffer 510 and local index buffer 508, respectively, could be introduced into those buffers by implementing the method 600 discussed above in conjunction with FIG. 6.

At step 704, stream output unit 512 communicates the number of vertices within local vertex buffer 510 and the number of indices within local index buffer 508 to SSYNC unit 514. At step 706, stream output unit 512 receives a base address within global vertex buffer 518 and a base address within global index buffer 516 from SSYNC unit 514. The base address within global vertex buffer 518 represents a position within that buffer where stream output unit 512 may safely write the number of vertices communicated to SSYNC unit 514 by stream output unit 512. Likewise, the base address within global index buffer 516 represents a position within that buffer where stream output unit 512 may safely write the number of indices communicated to SSYNC unit 514 by stream output unit 512. SSYNC unit 514 is configured to generate these base addresses by implementing the technique described above in conjunction with FIG. 5, also described below in conjunction with FIG. 8.

At step 708, stream output unit 512 streams vertices from local vertex buffer 510 to global vertex buffer 518 starting at the base address within global vertex buffer 518 provided by SSYNC unit 514. At step 712, stream output unit 512 streams indices from local index buffer 508 to global index buffer 516 starting at the base address within global index buffer 516 provided by SSYNC unit 514. In doing so, stream output unit 512 is configured to update those indices to reflect the new positions of the referenced vertices within global vertex buffer 518. In one embodiment, stream output unit 512 increments each index by a value equal to the base address within global vertex buffer 518 provided by SSYNC unit 514 at step 706. The method then ends.

By implementing the approach described above, each of geometry processing units 550-0 to 550-N is configured to stream locally buffered vertices and indices to global vertex buffer 518 and global index buffer 516, respectively. In addition, each such geometry processing unit 550 may stream vertices and indices to global vertex buffer 518 and global index buffer 516, respectively, in parallel within other geometry processing units 550. A technique that may be implemented by SSYNC unit 514 to provide base addresses within those buffers to geometry processing units 550 is described below in conjunction with FIG. 8.

Figure 8:
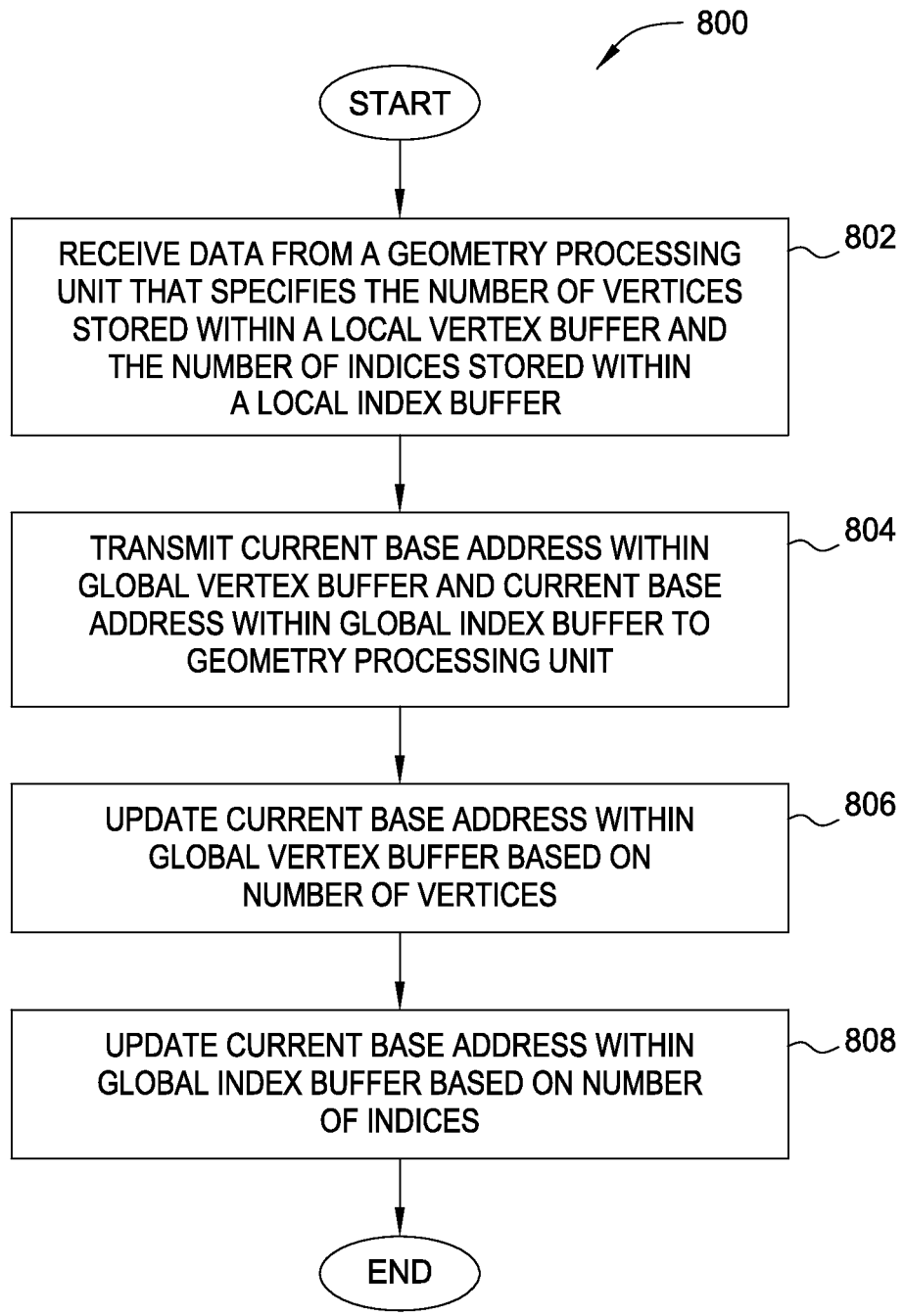
FIG. 8 is a flow diagram of method steps for populating a plurality of global buffers, according to one embodiment of the present invention.

FIG. 8 is a flow diagram of method steps for populating a plurality of global buffers, according to one embodiment of the present invention. Although the method steps are described in conjunction with the systems of FIGS. 1-3, persons of ordinary skill in the art will understand that any system configured to perform the method steps, in any order, is within the scope of the invention.

As shown, a method 800 begins at step 802, where SSYNC unit 514 receives data from stream output unit 512 within geometry processing unit 550 that specifies the number of vertices stored within local vertex buffer 510 and the number of indices stored within local index buffer 508. At step 804, SSYNC unit 514 transmits the current base address within global vertex buffer 518 and the current base address within global index buffer 516 to stream output unit 514. The base address within global vertex buffer 518 represents a position within that buffer where stream output unit 512 may safely write the number of vertices communicated to SSYNC unit 514 by stream output unit 512. Likewise, the base address within global index buffer 516 represents a position within that buffer where stream output unit 512 may safely write the number of indices communicated to SSYNC unit 514 by stream output unit 512.

At step 806, SSYNC unit 514 updates the current base address within global vertex buffer 518 based on the number of vertices specified by stream output unit 514. SSYNC unit 514 may also update the current base address within global vertex buffer 518 based on the size of those vertices. At step 808, SSYNC unit 514 updates the current base address within global index buffer 516 based on the number of indices specified by stream output unit 514. SSYNC unit 514 may also update the current base address within global index buffer 516 based on the size of those indices. The method 800 then ends.

By implementing the approach described above, SSYNC unit 514 is capable of maintaining base addresses within global vertex buffer 518 and global index buffer 516 that represent addresses within those buffers where data may be safely written. When servicing geometry processing units 550 sequentially, SSYNC unit 514 is thus capable of providing different base addresses within those buffers to each geometry processing unit 550 in the sequence.

Figure 9:
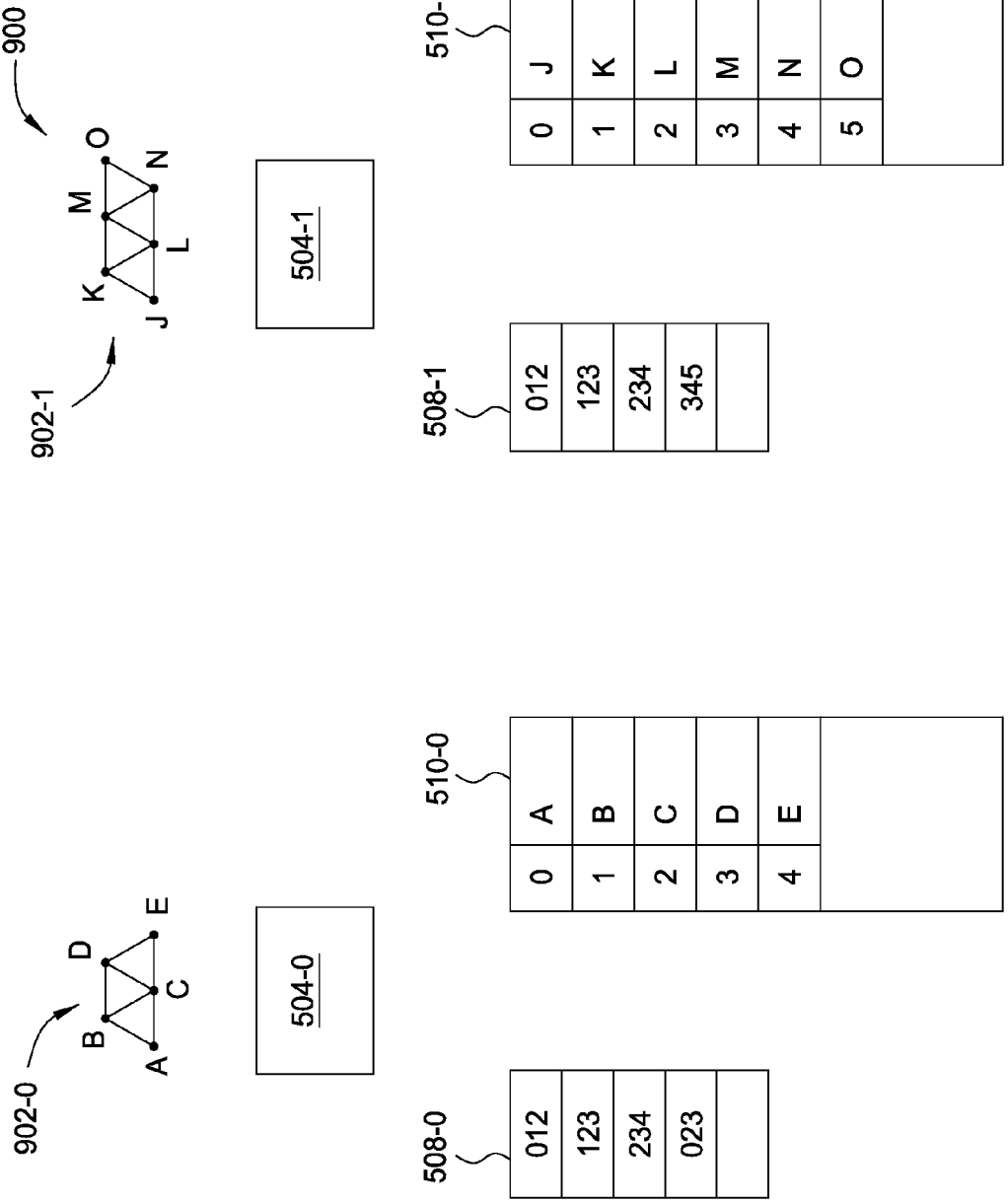
FIG. 9 is a conceptual diagram illustrating exemplary geometry processing units configured to buffer indices and vertices locally, according to one embodiment of the present invention.
Figure 10:
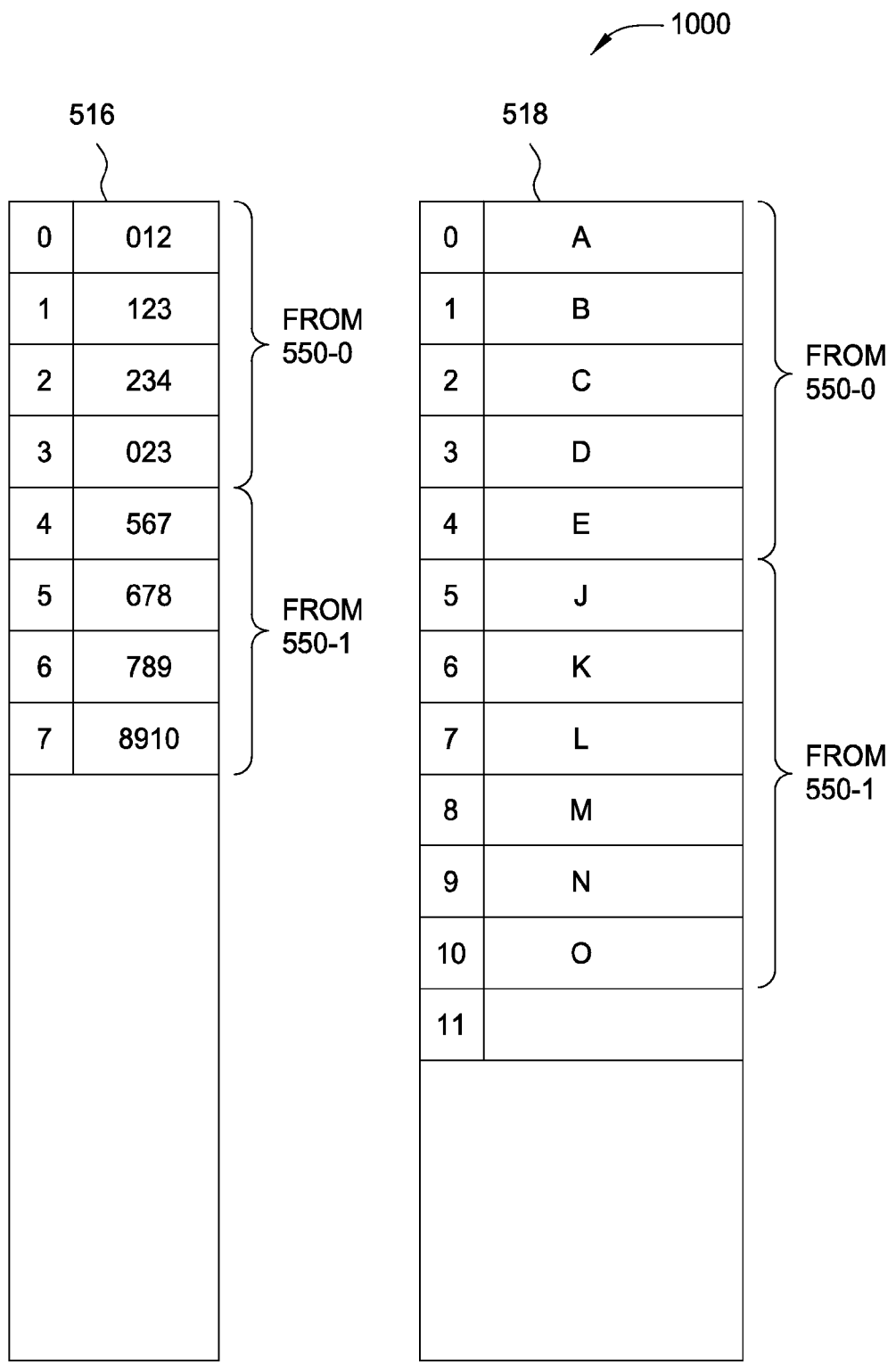
FIG. 10 is a conceptual diagram illustrating exemplary global buffers configured to store indices or vertices, according to one embodiment of the present invention.

The various techniques described above in conjunction with FIGS. 5-8 are illustrated by way of example in conjunction with FIGS. 9-10.

FIG. 9 is a conceptual diagram illustrating exemplary geometry processing units 550-0 and 550-1 configured to store indices and vertices, according to one embodiment of the present invention. As shown, geometry processing unit 550-0 includes geometry shading unit 504-0, local index buffer 508-0 and local vertex buffer 510-0. Likewise, geometry processing unit 502-1 includes geometry shading unit 504-1, local index buffer 508-1 and local vertex buffer 510-1. Geometry processing units 550-0 and 550-1 are also shown in FIG. 5, although in this example, certain elements of those geometry processing units 550 have been omitted for the sake of clarity.

Geometry processing unit 550-0 is configured to receive vertex data and related geometry information associated with a graphics primitive or geometry object 502. Geometry shading unit 504-0 then generates geometry object 502-0 that represents a strip of triangles, where vertices A, B, C, D, and E are vertices associated with those triangles. Geometry shading unit 504-0 is further configured to then store those vertices, and associated vertex data, within local vertex buffer 510-0. Since different triangles associated with geometry object 502-0 share vertices, those shared vertices may only be included within local vertex buffer 510-0 just once. Geometry shading unit 504-0 is also configured to store indices that reference those vertices within local index buffer 508-0, as is shown. In situations where a given vertex already resides within local vertex buffer 510-0, geometry shading unit 504-0 may introduce an index to that vertex into local index buffer 508-0 without re-storing that vertex in local vertex buffer 510-0, thereby avoiding redundant copies of vertex data. In the exemplary scenario discussed herein, geometry shading unit 504-0 generates triangles from geometry object 502-0 based on a clockwise or counter-clockwise winding direction. Those skilled in the art will recognize that geometry shading unit 504-0 could generate triangles and/or other graphics primitives using any particular winding direction or combination of winding directions.

In addition, geometry shading unit 504-0 may also introduce a set of indices that represent a triangle not included within geometry object 502-0 (e.g., triangle ACD corresponding to indices 0, 2, and 3). In one embodiment, geometry shading unit 504-0 is configured to generate the different triangles formed by vertices A, B, C, D, and E by subdividing a complex geometry object 502 into those different triangles. In another embodiment, geometry shading unit 504-0 may be configured to generate the different triangles formed by vertices A, B, C, D, and E by replicating a simple geometry object 502, such as a single triangle. Geometry shading unit 504-0 may also store indices within local index buffer 508-0 that represent geometry object 502-0 as a whole, i.e., indices that represent all of vertices A, B, C, D, and E.

Like geometry processing unit 550-0, geometry processing unit 550-1 is configured to receive vertex data and related geometry information associated with a graphics primitive or geometry object 502. Geometry shading unit 504-1 then generates geometry object 502-1 that represent a strip of triangles, where vertices J, K, L, M, N, and O are vertices associated with those triangles. Geometry shading unit 504-1 is further configured to then store those vertices, and associated vertex data, within local vertex buffer 510-1. Since different triangles associated with geometry object 502-1 share vertices, those shared vertices may only be included within local vertex buffer 510-1 just once. Geometry shading unit 504-1 is also configured to store indices that reference those vertices within local index buffer 508-1, as is shown. In situations where a given vertex already resides within local vertex buffer 510-1, geometry shading unit 504-1 may introduce an index to that vertex into local index buffer 508-1 without re-storing that vertex in local vertex buffer 510-1, thereby avoiding redundant copies of vertex data. In the exemplary scenario discussed herein, geometry shading unit 504-1 generates triangles from geometry object 502-1 based on a clockwise or counter-clockwise winding direction. Those skilled in the art will recognize that geometry shading unit 504-1 could generate triangles and/or other graphics primitives using any particular winding direction or combination of winding directions.

In one embodiment, geometry shading unit 504-1 is configured to generate the different triangles formed by vertices J, K, L, M, N, and O by subdividing a complex geometry object 502 into those different triangles. In another embodiment, geometry shading unit 504-1 may be configured to generate the different triangles formed by vertices J, K, L, M, N, and O by replicating a simple geometry object 502, such as a single triangle. Geometry shading unit 504-1 may also store indices within local index buffer 508-1 that represent geometry object 502-1 as a whole, i.e. indices that represent all of vertices J, K, L, M, N, and O.

Stream output units 512-0 and 512-1 (shown in FIG. 5) may then stream the vertices and indices stored in the respective local vertex buffer 510 and local index buffer 508 to global vertex buffer 518 and global index buffer 516, respectively, based on base addresses provided by SSYNC unit 514. An exemplary global vertex buffer 518 and an exemplary global index buffer 516 are shown in FIG. 10.

FIG. 10 is a conceptual diagram illustrating an exemplary global vertex buffer 518 and an exemplary global index buffer 516 configured to store vertices and indices, respectively, according to one embodiment of the present invention.

As shown, global vertex buffer 518 includes each different vertex associated with graphics primitives 502-0 and 502-1 shown in FIG. 9. Specifically, global vertex buffer 518 includes vertices A, B, C, D, E, corresponding to graphics primitives 502-0, as well as vertices J, K, L, M, N, and O corresponding to graphics primitives 502-1. Geometry processing unit 550-0 is configured to write vertices A-E to global index buffer 518 based on a base address received from SSYNC unit 514. Likewise, geometry processing unit 550-1 is configured to write vertices J-O to global index buffer 518 based on a different base address received from SSYNC unit 514. As also shown, global index buffer 516 includes indices to the vertices stored within global vertex buffer 518. Geometry processing units 550-0 and 550-1 are configured to write these indices to global index buffer 516 based on the indices stored within local index buffers 508-0 and 508-1, respectively, and based on base addresses received from SSYNC unit 514.

In this example, SSYNC unit 514 services geometry processing units 550-0 and 550-1 sequentially, starting with geometry processing unit 550-0. SSYNC unit 514 receives data from geometry processing unit 550-0 that indicates the number of vertices A-E to be written to global vertex buffer 518 (that number being 5, in this example). SSYNC unit 514 responds to geometry processing unit 550-0 with the current base address within global vertex buffer 518. Initially, SSYNC unit 514 maintains an initial base address within global vertex buffer 518 of "0." SSYNC unit 514 then updates that current base address based on the number of vertices geometry processing unit 550-0 will write to global vertex buffer 518 in order to reflect a new base address within global vertex buffer 518 where additional vertices and associated data may be safely written (in this example, a base address of "5").

After receiving the data from geometry processing unit 550-0 indicating the number of vertices A-E, SSYNC unit 514 may then receive additional data from geometry processing unit 550-0 that indicates the number of different sets of indices to be written to global index buffer 516 (that number being 4, in this example). Again, each set of indices may correspond to a different triangle within graphics primitives 502-0. SSYNC unit 514 responds to geometry processing unit 550-0 with the current base address within global index buffer 516. Initially, SSYNC unit 514 maintains an initial base address within global index buffer 516 of "0." SSYNC unit 514 then updates that current base address based on the number of indices geometry processing unit 550-0 will write to global index buffer 516 in order to reflect a new base address within global index buffer 516 where additional indices may be safely written (in this example, a base address of "4").

Subsequently, SSYNC unit 514 may service geometry processing unit 550-1. SSYNC unit 514 receives data from geometry processing unit 550-1 that indicates the number of vertices J-O to be written to global vertex buffer 518 (that number being 6, in this example). SSYNC unit 514 responds to geometry processing unit 550-1 with the current base address within global vertex buffer 518 of "6." SSYNC unit 514 then updates that current base address based on the number of vertices geometry processing unit 550-1 will write to global vertex buffer 518 in order to reflect a new base address within global vertex buffer 518 where vertices and associated data may be safely written (in this example, a base address of "11").

After receiving the data from geometry processing unit 550-1 indicating the number of vertices J-O, SSYNC unit 514 may then receive additional data from geometry processing unit 550-1 that indicates the number of different sets of indices to be written to global index buffer 516 (that number being 4, in this example). Again, each set of indices may correspond to a different triangle within graphics primitives 502-1. SSYNC unit 514 responds to geometry processing unit 550-1 with the current base address within global index buffer 516 of "4." SSYNC unit 514 then updates that current base address based on the number of indices geometry processing unit 550-1 will write to global index buffer 516 in order to reflect a new base address within global index buffer 516 where additional indices may be safely written (in this example, a base address of "8").

When geometry processing units 550-0 or 550-1 write indices to global index buffer 516 according to the technique described above, each of those geometry processing units 550 is configured to update the indices based on the base address within global vertex buffer 518 received from SSYNC unit 514. Accordingly, geometry processing unit 550-0 may increment each index by "0," the base address within global vertex buffer 518 provided by SSYNC unit 514 when servicing geometry processing unit 550-0. Likewise, geometry processing unit 550-1 may increment each index by "5," the base address within global vertex buffer 518 provided by SSYNC unit 514 when servicing geometry processing unit 550-1. With this approach, each geometry processing unit 550 updates indices streamed to global index buffer 516 to reflect correct vertices stored within global vertex buffer 518.

Persons skilled in the art will understand that the example described in conjunction with FIGS. 9 and 10 represents just one possible situations in which the functionality of the present invention may be implemented, that the present invention may also be implemented in a wide variety of other situations.

In sum, a graphics processing unit includes a set of geometry processing units each configured to process graphics primitives or geometry objects in parallel with one another. A given geometry processing unit generates one or more graphics primitives or one or more geometry objects and buffers vertex data related to the graphics primitive(s) or geometry object(s) locally. The geometry processing unit also buffers different sets of indices to those vertices, where each such set represents a different graphics primitive or geometry object. The geometry processing units may then stream the buffered vertices and indices to global buffers. A stream output synchronization unit coordinates the streaming of vertices and indices across the different geometry processing units by providing each geometry processing unit with a different base address within a global vertex buffer where vertices may be written. The stream output synchronization unit also provides each geometry processing unit with a different base address within a global index buffer where indices may be written.

Advantageously, with the disclosed approach, the geometry processing unit does not store redundant copies of vertex data since the vertex data may be indexed locally, thereby conserving GPU resources. In addition, each such geometry processing unit may store locally generated vertex data in a global vertex buffer that also is indexed. The indices for the global index buffer are rationalized across all geometry processing units so that the size of the vertex buffer may be optimized for the overall system. Because the indexed global vertex buffer is indexed, that buffer may be substantially smaller than conventional non-indexed global vertex buffers. Consequently, with a smaller global vertex buffer, feeding the global vertex buffer back to stages of the graphics processing pipeline upstream of the geometry processing units becomes a far more efficient exercise relative to prior art architectures, thereby increasing overall system processing efficiency.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for buffering data associated with graphics primitives or geometry objects, the method comprising:
   receiving, at a first geometry processor, a first geometry object or a first graphics primitive, wherein the first geometry processor is included in a plurality of geometry processors;
   generating, via a first geometry shader included in the first geometry processor, a first set of vertices based on the first geometry object or the first graphics primitive; and
   storing, via the first geometry shader, a first set of indices as a first entry in a local index buffer, wherein each index in the first set of indices references a different vertex in the first set of vertices, and wherein the first entry corresponds to a graphics primitive or a geometry object associated with the first set of vertices.

2. The computer-implemented method of claim 1, further comprising storing the first set of vertices within a local vertex buffer, wherein each index in the first set of indices references a location within the local vertex buffer associated with a different vertex in the first set of vertices.

3. The computer-implemented method of claim 2, further comprising:
   generating a first set of graphics primitives based on the first geometry object or the first graphics primitive, wherein each graphics primitive in the first set of graphics primitives includes at least one vertex within the first set of vertices;
   generating a different set of indices for each graphics primitive in the first set of graphics primitives;
   storing each set of indices as a different entry in the local index buffer; and
   storing one instance of each vertex in the first set of vertices within the local vertex buffer.

4. The computer-implemented method of claim 2, further comprising:
   receiving a second geometry object or a second graphics primitive;
   generating a second set of vertices based on the second geometry object or the second graphics primitive;
   determining that a vertex in the second set of vertices is also included in the first set of vertices;
   storing a second set of indices as a second entry in the local index buffer, wherein the second set of indices includes an index that references the vertex in the second set of vertices that is also included in the first set of vertices, and wherein the second entry corresponds to a graphics primitive or geometry object associated with the second set of vertices; and
   storing one instance of each vertex in the second set of vertices that is not included in the first set of vertices within the local vertex buffer.

5. The computer-implemented method of claim 2, further comprising:
   determining a number of vertices stored within the local vertex buffer;

transmitting the number of vertices stored within the local vertex buffer to a stream synchronization unit;
receiving from the stream synchronization unit a base address associated with a global vertex buffer; and
writing the vertices stored within the local vertex buffer to the global vertex buffer in accordance with the base address within the global vertex buffer.

6. The computer-implemented method of claim 5, further comprising:
determining a number of indices stored within the local index buffer;
transmitting the number of indices stored within the local index buffer to the stream synchronization unit;
receiving from the stream synchronization unit a base address associated with a global index buffer;
generating global indices into the global vertex buffer by updating the indices stored within the local index buffer in accordance with the base address within the global vertex buffer; and
writing the global indices into the global vertex buffer to the global index buffer based on the base address within the global index buffer.

7. The computer-implemented method of claim 5, wherein generating global indices into the global vertex buffer by updating the indices stored within the local index buffer comprises incrementing each index stored within the local index buffer by the base address within the global vertex buffer.

8. The computer-implemented method of claim 1, wherein each index in the first set of indices comprises an address, an offset, or a local index associated with the local vertex buffer that corresponds to a different vertex stored within the local vertex buffer.

9. A graphics subsystem, comprising:
a plurality of geometry processors that includes a first geometry processor configure to:
receive a first geometry object or a first graphics primitive;
generate, via a first geometry shader included in the first geometry processor, a first set of vertices based on the first geometry object or first graphics primitive; and
store, via the first geometry shader, a first set of indices as a first entry in a local index buffer, wherein each index in the first set of indices references a different vertex in the first set of vertices, and wherein the first entry corresponds to a graphics primitive or a geometry object associated with the first set of vertices.

10. The graphics subsystem of claim 9, wherein the first geometry shader is further configured to store the first set of vertices within a local vertex buffer, wherein each index in the first set of indices references a location within the local vertex buffer associated with a different vertex in the first set of vertices.

11. The graphics subsystem of claim 10, wherein the first geometry processor is further configured to:
generate, via the first geometry shader, a first set of graphics primitives based on the first geometry object or the first graphics primitive, wherein each graphics primitive in the first set of graphics primitives includes at least one vertex within the first set of vertices;
generate, via the first geometry shader, a different set of indices for each graphics primitive in the first set of graphics primitives;
store, via the first geometry shader, each set of indices as a different entry in the local index buffer; and
store, via the first geometry shader, one instance of each vertex in the first set of vertices within the local vertex buffer.

12. The graphics subsystem of claim 10, wherein the first geometry processor is further configured to:
receive a second geometry object or a second graphics primitive;
generate, via the first geometry shader, a second set of vertices based on the second geometry object or the second graphics primitive;
determine, via the first geometry shader, that a vertex in the second set of vertices is also included in the first set of vertices;
store, via the first geometry shader, a second set of indices as a second entry in the local index buffer, wherein the second set of indices includes an index that references the vertex in the second set of vertices that is also included in the first set of vertices, and wherein the second entry corresponds to a graphics primitive or geometry object associated with the second set of vertices; and
store, via the first geometry shader, one instance of each vertex in the second set of vertices that is not included in the first set of vertices within the local vertex buffer.

13. The graphics subsystem of claim 10, wherein the first geometry processor is further configured to:
determine a number of vertices stored within the local vertex buffer;
transmit the number of vertices stored within the local vertex buffer to a stream synchronization unit;
receive from the stream synchronization unit a base address associated with a global vertex buffer; and
write the vertices stored within the local vertex buffer to the global vertex buffer in accordance with the base address within the global vertex buffer.

14. The graphics subsystem of claim 13, wherein the first geometry processor is further configured to:
determine a number of indices stored within the local index buffer;
transmit the number of indices stored within the local index buffer to the stream synchronization unit;
receive from the stream synchronization unit a base address associated with a global index buffer;
generate global indices into the global vertex buffer by updating the indices stored within the local index buffer in accordance with the base address within the global vertex buffer; and
write the global indices into the global vertex buffer to the global index buffer based on the base address within the global index buffer.

15. The graphics subsystem of claim 13, wherein the first geometry processor is configured to generate global indices into the global vertex buffer by updating the indices stored within the local index buffer comprises incrementing each index stored within the local index buffer by the base address within the global vertex buffer.

16. The graphics subsystem of claim 9, wherein each index in the first set of indices comprises an address, an offset, or a local index associated with the local vertex buffer that corresponds to a different vertex stored within the local vertex buffer.

17. A computing device configured to buffer data associated with geometry objects, including:
a plurality of processors that includes a first processor configured to:
receive a first geometry object or a first graphics primitive,
generate, via a first geometry shader implemented by the first processor, a first set of vertices based on the first geometry object or the first graphics primitive, and store a first set of indices as a first entry in a local index buffer, wherein each index in the first set of indices references a different vertex in the first set of vertices, and wherein the first entry corresponds to a graphics primitive or a geometry object associated with the first set of vertices.

18. The computing device of claim 17, further including:
a memory unit coupled to the first processor and storing program instructions that, when executed by the first processor cause the first processor to:
  receive the first geometry object or graphics primitive,
  generate, via the first geometry shader, the first set of vertices, and store the first set of indices within the first entry in the local index buffer.

19. The computing device of claim 17, wherein the first processor is further configured to store, via the first geometry shader, the first set of vertices within a local vertex buffer, and each index in the first set of indices references a location within the local vertex buffer associated with a different vertex in the first set of vertices.

20. The computing device of claim 19, wherein the first processor is further configured to:
  generate, via the first geometry shader, a first set of graphics primitives based on the first geometry object or the first graphics primitive, wherein each graphics primitive in the first set of graphics primitives includes at least one vertex within the first set of vertices;
  generate, via the first geometry shader, a different set of indices for each graphics primitive in the first set of graphics primitives;
  store each set of indices as a different entry in the local index buffer; and
  store one instance of each vertex in the first set of vertices within the local vertex buffer.

\* \* \* \* \*